(12) United States Patent
Koh et al.

(10) Patent No.: US 8,189,092 B2
(45) Date of Patent: May 29, 2012

(54) APPARATUS AND METHOD FOR ADJUSTING FOCUS USING MODULATION TRANSFER FUNCTIONS

(75) Inventors: Sung-shik Koh, Changwon (KR);
Kazuhiko Sugimoto, Changwon (KR);
Dong Yi, Changwon (KR);
Byoung-kwon Lee, Changwon (KR);
Eun-ho Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 12/465,781

(22) Filed: May 14, 2009

(65) Prior Publication Data
US 2010/0026877 A1    Feb. 4, 2010

(30) Foreign Application Priority Data
Aug. 1, 2008  (KR) .................. 10-2008-0075575

(51) Int. Cl.
*H04N 5/232* (2006.01)
(52) U.S. Cl. ........................................ 348/349
(58) Field of Classification Search .............. 348/349, 348/345, 351, 354, 396
See application file for complete search history.

(56) References Cited

U.S. PATENT DOCUMENTS

| 4,422,097 | A | * | 12/1983 | Inuiya ........................ 348/353 |
| 5,353,089 | A | | 10/1994 | Yaji |
| 6,229,568 | B1 | * | 5/2001 | Kawaguchi et al. .......... 348/350 |
| 2006/0238640 | A1 | | 10/2006 | Hofer |

FOREIGN PATENT DOCUMENTS

| JP | 05-142467 A | 6/1993 |
| JP | 08-170143 A | 7/1996 |
| JP | 2002-250864 A | 9/2002 |
| JP | 2006-113468 A | 4/2006 |

* cited by examiner

*Primary Examiner* — Hung Dang
(74) *Attorney, Agent, or Firm* — Drinker Biddle & Reath LLP

(57) ABSTRACT

Provided are an apparatus and method for adjusting focus using the MTF characteristics of a lens in a digital image processing apparatus that adjusts focus using optical characteristics of a lens. The apparatus for adjusting focus includes: an image pickup unit in which modulation transfer function (MTF) data, which can be used to represent the performance of a lens, is stored; and a digital signal processing unit that calculates a focus peak value of an image and a defocus correction value based on the MTF data, and corrects the focus position using the focus peak value and the defocus correction value.

15 Claims, 6 Drawing Sheets

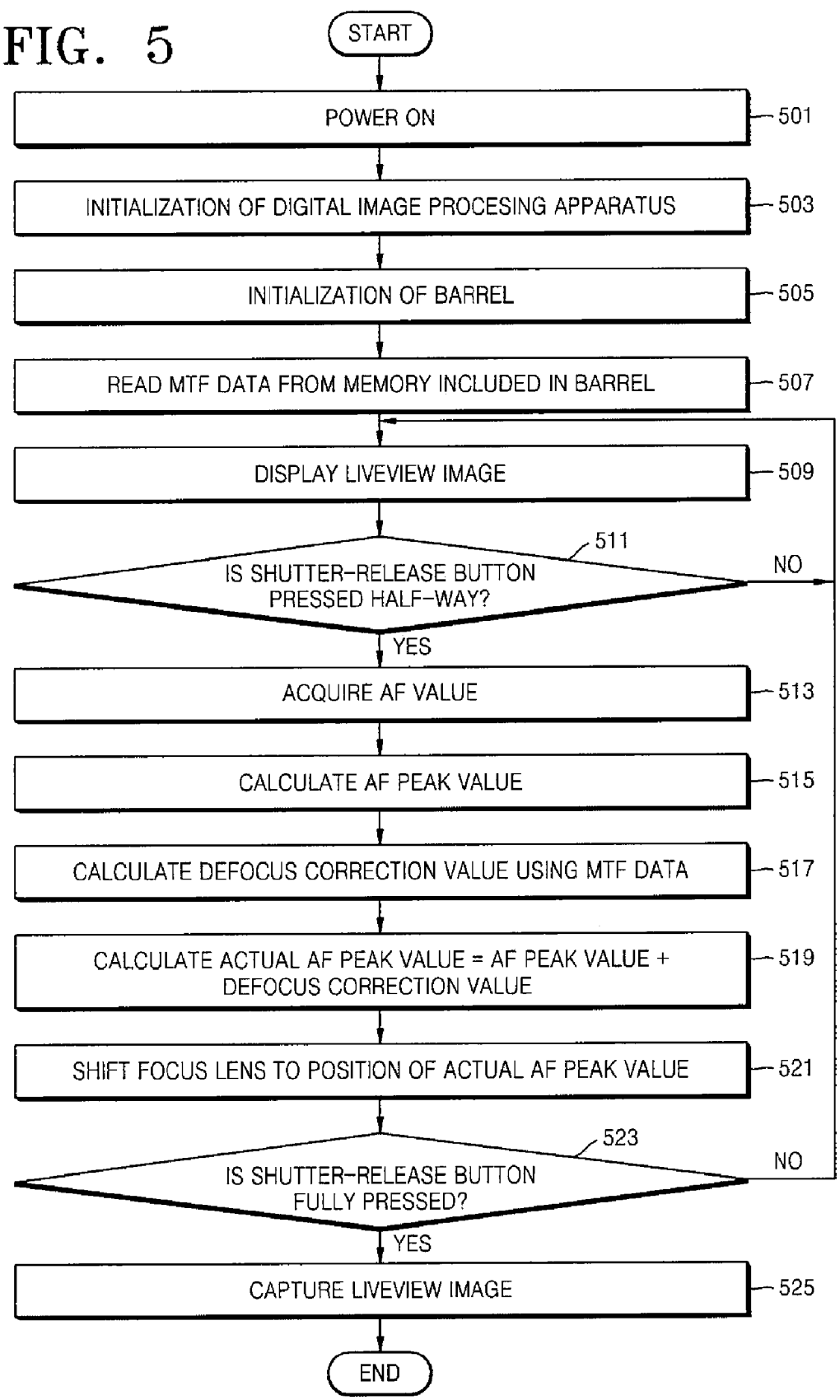

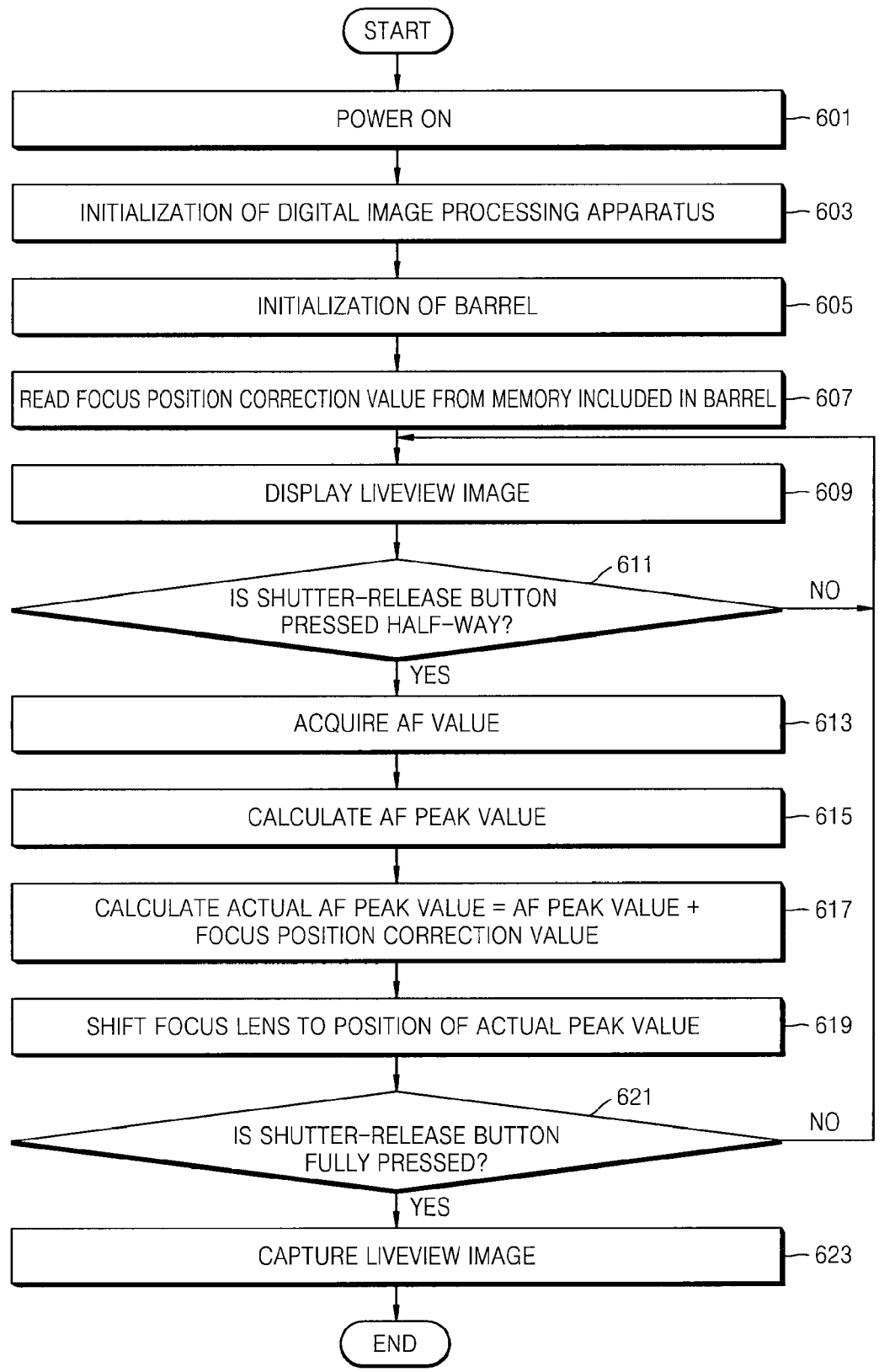

ent of the present invention;

APPARATUS AND METHOD FOR ADJUSTING FOCUS USING MODULATION TRANSFER FUNCTIONS

CROSS-REFERENCE TO RELATED PATENT APPLICATION

This application claims the benefit of Korean Patent Application No. 10-2008-0075575, filed on Aug. 1, 2008 in the Korean Intellectual Property Office, the disclosure of which is incorporated herein in its entirety by reference.

BACKGROUND OF THE INVENTION

1. Field of the Invention

The present invention relates to an apparatus and method for processing digital images, and more particularly, to an apparatus and method for adjusting focus using the modulation transfer function (MTF) characteristics of a lens in a digital image processing apparatus.

2. Description of the Related Art

With regard to a focus adjustment method in which the position of a focus lens is controlled so that high frequency components of an image are maximized, it is not easy to achieve a focused image because, in general, a peak value of a curve of MTF characteristics and a peak value of an AF curve do not overlap. This lack of overlap makes it difficult to obtain an image with a properly adjusted focus. Such a phenomenon is even more problematic in lens-reflex digital image processing apparatuses.

SUMMARY OF THE INVENTION

The present invention provides an apparatus and method for adjusting focus using MTF characteristics of a lens in a digital image processing apparatus, wherein a memory, which stores the MTF characteristics of a lens is included in a barrel, and a defocus correction value or a focus position correction value is calculated from the MTF characteristics stored in the memory, and a focus peak value is shifted by the correction value to adjust focus.

According to an aspect of the present invention, there is provided an apparatus for adjusting focus in a digital image processing apparatus, the apparatus comprising: an image pickup unit in which modulation transfer function (MTF) data, which is usable to represent the performance of a lens, is stored; and a digital signal processing unit that calculates a focus peak value of an image and a defocus correction value based on the MTF data, and that corrects a focus position using the focus peak value and the defocus correction value.

The digital signal processing unit may read the MTF data from the image pickup unit when the digital image processing apparatus is initialized.

The digital signal processing unit may comprise: a focus value calculation unit that calculates focus values with respect to an image according to the movement of the focus lens; a focus correction unit that calculates a defocus correction value based on the MTF data and an actual focus peak value using the total value of the focus peak value and the defocus correction value; and a focus motor controlling unit that corrects the focus position to a position corresponding to the actual focus peak value.

The defocus correction value may be calculated differently according to the position of a zoom lens, the type of the focus lens, the pixel number of an image sensor, the display condition of a liveview image, and the movement amount/speed of a focus motor.

According to another aspect of the present invention, there is provided an apparatus for adjusting focus in a digital image processing apparatus, the apparatus comprising: an image pickup unit that stores a focus position correction value of a lens; and a digital signal processing unit that corrects the focus position using an AF peak value calculated from an image and the focus correction value.

The focus correction value may be stored differently according to the position of a zoom lens.

The digital signal processing unit may read the focus position correction values from the image pickup unit when the digital image processing apparatus is initialized.

The digital signal processing unit may comprise: a focus value calculation unit that calculates focus values with respect to an image according to the movement of the lens; a focus correction unit that calculates an actual focus peak value with the total value of the focus peak value and the focus position correction value; and a focus motor control unit that corrects the focus position to a position corresponding to the actual focus peak value.

According to another aspect of the present invention, there is provided a method of adjusting focus of a digital image processing apparatus, the method comprising: (a) calculating focus values from an image according to the movement of a focus lens; (b) calculating a defocus correction value from modulation transfer function (MTF) data that is usable to represent the performance of a lens included in the digital image processing apparatus; and (c) correcting the focus position using the focus peak value and the defocus correction value.

Before (a), the MTF data may be read when the digital image processing apparatus is initialized.

In (b), the defocus correction value may be calculated differently according to the position of a zoom lens, the type of the focus lens, the pixel number of an image sensor, the display condition of a liveview image, and the movement amount/speed of a focus motor.

In (c), an actual focus peak value may be calculated using the total value of the focus peak value and the defocus correction value to correct the focus position to a position corresponding to the actual focus peak value.

According to another aspect of the present invention, there is provided a method of operating a digital image processing apparatus, the method comprising: (a) receiving a focus position correction value of a lens included in the digital image processing apparatus; (b) calculating focus values from an image according to the movement of a focus lens; and (c) correcting the focus position using a focus peak value and the focus position correction value.

The focus position correction value may differ according to the position of a zoom lens.

In (c), an actual focus peak value may be calculated using the total value of the focus peak value and the focus position correction value to correct the focus position to a position corresponding to the actual focus peak value.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating a method of adjusting focus using MTF characteristics of a lens in a digital image processing apparatus according to an embodiment of the present invention; and FIG. 6 is a flowchart illustrating a method of adjusting focus using MTF characteristics of a lens in a digital image processing apparatus according to another embodiment of the present invention.

DETAILED DESCRIPTION OF THE INVENTION

The present invention will now be described more fully with reference to the accompanying drawings, in which exemplary embodiments of the invention are shown.

Figure 1:
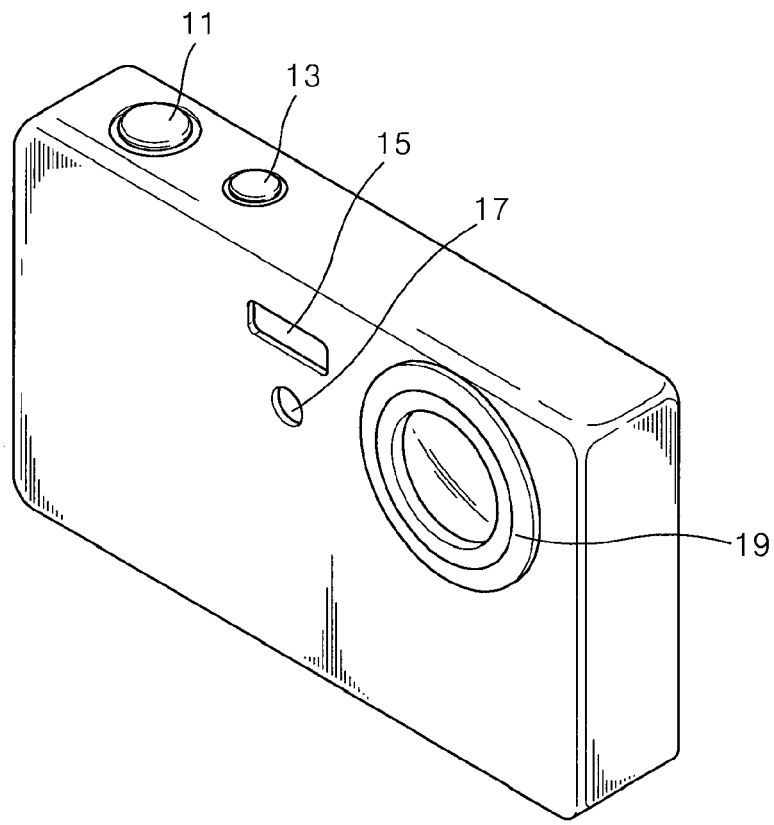
FIG. 1 is a perspective view illustrating the front and top of a digital image processing apparatus according to an embodiment of the present invention.

FIG. 1 is a perspective view illustrating the front and top of a digital image processing apparatus.

Referring to FIG. 1, the digital image processing apparatus includes a shutter-release button 11, a power button 13, a flash unit 15, an auxiliary light unit 17, and a lens unit 19. The shutter-release button 11 is pressed to expose a charge coupled device (CCD) to light for a predetermined period of time, and works together with an aperture (not shown) to properly expose an object to light and record an image of the object via the CCD.

The shutter-release button 11 is pressed by a user to generate first and second image photographing signals. If the shutter-release button 11 is depressed half-way, the digital image processing apparatus performs focusing and adjusts the aperture i.e. the amount of light. When correct focus is achieved, a green light is turned on in a display unit 23 illustrated in FIG. 2. After the shutter-release button 11 is depressed half-way, the correct focus is obtained, and the amount of light is adjusted, the shutter-release button 11 is fully depressed to capture an image.

The power button 13 is pressed to supply power to the digital image processing apparatus and operate the digital image processing apparatus. The flash unit 15 provides a brief pulse of light when an image is photographed in the dark. Flash modes include an auto flash mode, a fill flash mode, a no flash mode, a red-eye reduction mode, and a slow synchronization mode.

The auxiliary light unit 17 supplies light to an object so that the digital image processing apparatus can perform autofocusing quickly and accurately when the object lacks illumination or photographing is performed at night.

The lens unit 19 receives light from an external light source and processes an image.

Figure 2:
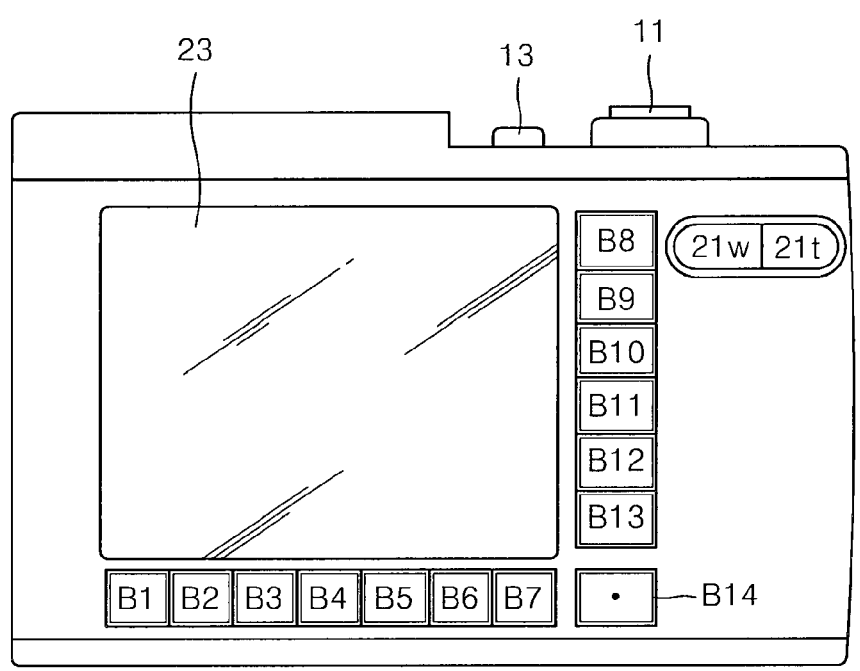
FIG. 2 is a rear view illustrating the back of the digital image processing apparatus of FIG. 1 according to an embodiment of the present invention.

FIG. 2 is a rear view illustrating the back of the digital image processing apparatus of FIG. 1. The back of the digital image processing apparatus includes a wide angle-zoom button 21w, a telephoto-zoom button 21t, a display unit 23, and input buttons B1 through B14 each including a touch sensor (not shown) or a contact switch (not shown).

When the wide angle-zoom button 21w or the telephoto-zoom button 21t is pressed, an angle of view is widened or narrowed. In particular, the wide angle-zoom button 21w or the telephoto-zoom button 21t is pressed to change a selected area. When the wide angle-zoom button 21w is pressed, the selected exposure area is reduced, and when the telephoto-zoom button 21t is pressed, the selected exposure area is expanded.

The input buttons B1 through B14 are vertically and horizontally arranged adjacent to the display unit 23. Each of the input buttons B1 through B14 vertically and horizontally arranged adjacent to the display unit 23 includes a touch sensor. If a touch sensor is included in each of the input buttons B1 through B14, an arbitrary item, e.g., color or brightness, among main menu items may be selected, or a sub menu icon included in a main menu icon may be selected by scrolling through the menus by sliding in an appropriate direction of the buttons B1 through B7 or B8 through B14, and then by selecting a desired item by pressing a corresponding button of the buttons B1 through B7 or B8 through B14.

Also, a contact switch is included in each of the buttons B1 through B14 so that the main-menu icon and the sub-menu icon may be directly selected to activate corresponding functions. A touch sensor does not require as firm a touch as a contact switch but a contact switch requires a firmer touch than the touch sensor.

Figure 3:
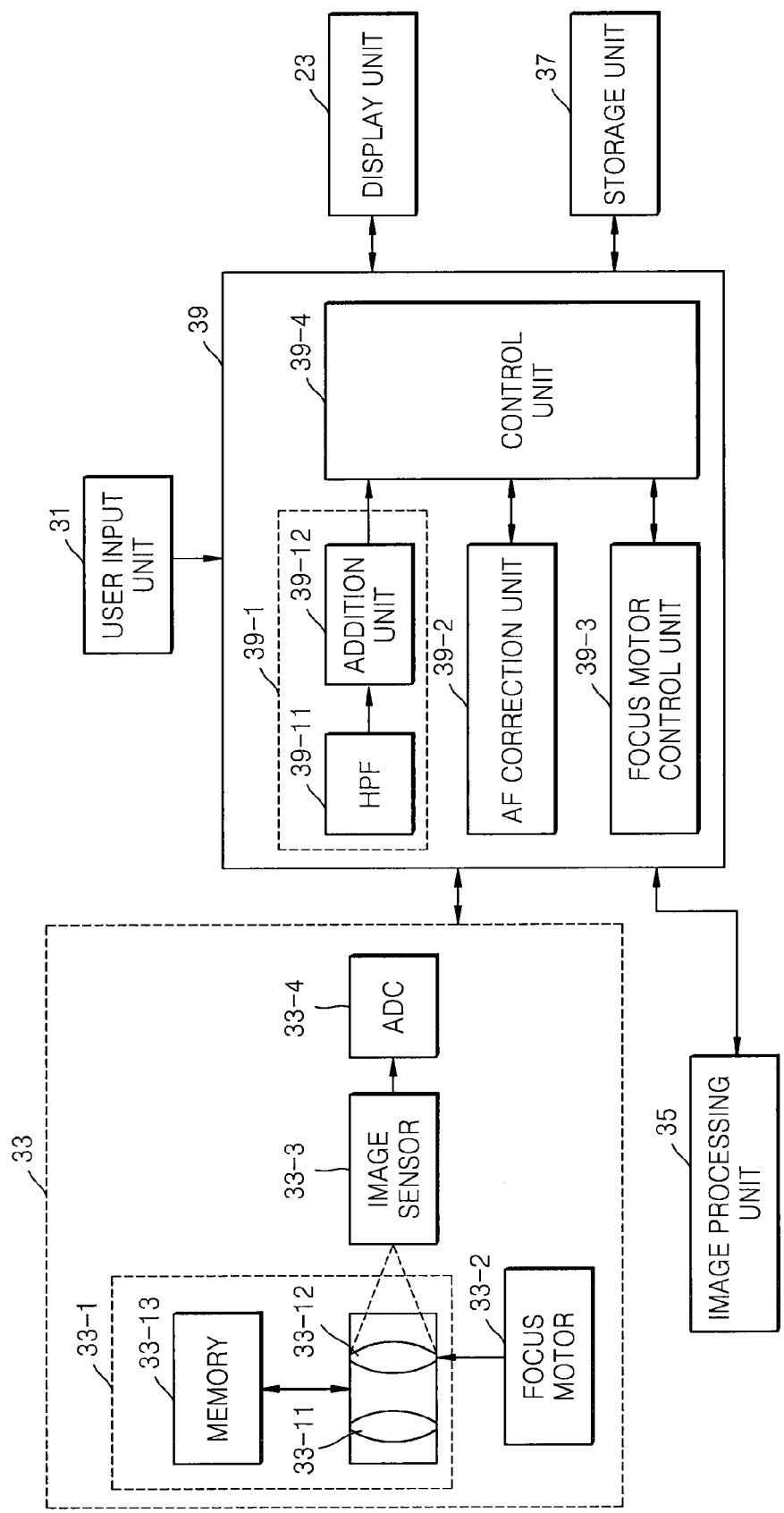
FIG. 3 is a block diagram of a focusing apparatus using modulation transfer function (MTF) characteristics of a lens of a digital image processing apparatus, according to an embodiment of the present invention.

FIG. 3 is a block diagram of a focusing apparatus using modulation transfer function characteristics according to an embodiment of the present invention. Referring to FIG. 3, the focusing apparatus of a lens of a digital image processing apparatus according to the current embodiment of the present invention includes a display unit 23, a user input unit 31, an image pickup unit 33, an image processing unit 35, a storage unit 37, and a digital signal processing unit 39.

The user input unit 31 includes a shutter-release button 11 which is pressed to expose a CCD to light for a predetermined period of time, a power button 13 supplying power, a wide angle-zoom button 21w and a telephoto-zoom button 21t widening or narrowing an angle of view, and input buttons B1 through B14 vertically and horizontally arranged adjacent to the display unit 23 to input characters and to select and operate menus and each including a touch sensor or a contact switch.

The image pickup unit 33 includes a barrel 33-1 including a zoom lens 33-11, a focus lens 33-12 and a memory 33-13, a focus motor 33-2, an image sensor 33-3, an analogue-to-digital converter (ADC) 33-4, a shutter (not shown), and an aperture (not shown).

The shutter and the aperture work together to adjust the amount of light. The zoom lens 33-11 and the focus lens 33-12 receive light from an external light source and process an image. The aperture adjusts its size according to the amount of incident light. The size of the aperture is controlled by the digital signal processing unit 39.

The optical axis of each of the zoom lens 33-11 and the focus lens 33-12 is aligned with the optical center of a light receiving surface of the image sensor 33-3. The focus lens 33-12 is movable linearly along the optical axis. The focus lens 33-12 is moved to focus an image on the light receiving surface of the image sensor 33-3. The focus lens 33-12 is moved by the focus motor 33-2 under the control of the digital signal processing unit 39.

Focus position correction values or modulation transfer function (MTF) data which examines the performance of a lens of a focus lens 33-12 included in the digital image processing apparatus, is stored in the memory 33-13. An MTF provides a value of the light amount (space frequency) transmitted through a lens, indicating how well the light from an object (original) is transmitted through the lens. MTF is usually used when measuring the performance of a lens or the optimum focus position. Thus, MTF data for examining the performance of the focus lens 33-12 or focus position correction values of the focus lens 33-12 for adjusting the optimum focus position are stored in the memory 33-13.

The image sensor 33-3 collects the amount of light input through the zoom lens 33-11 and the focus lens 33-12, and outputs the image taken by the zoom lens 33-11 and the focus lens 33-12 corresponding to the collected amount of light in response to a vertical sync signal. The digital image processing apparatus 39 captures an image using the image sensor 33-3 which converts light from an object into an electrical signal. In order to acquire a color image, a color filter is needed. A color filter array (CFA, not shown) is generally used. A CFA is an array of color filters regularly placed over the image sensor 33-4 in which each pixel of the CFA transmits light of only one color. The CFA may have various arrangements. The ADC 33-4 converts an analogue image signal output from the image sensor 33-3 into a digital image signal.

The image processing unit 35 processes digital raw data and displays the processed data. The image processing unit 35 reshifts a black level caused by a dark current generated in the CFA and the CCD which are sensitive to temperature change. The image processing unit 35 performs gamma correction that encodes information based on non-linear human visual response. The image processing unit 35 also performs CFA interpolation that interpolates missing color in a Bayer pattern comprised of RGRG lines and GBGB lines of the gamma corrected information into RGB lines to complete an RGB signal. The image processing unit 35 converts the RGB signal into a YUV signal, performs edge compensation that filters a Y signal using a high pass filter and obtains a clear image, and color correction that corrects color values of U and V signals using standard color coordinates, and reshifts noise of the Y, U, and V signals. The image processing unit 35 compresses and processes the Y, U, and V signals whose noise is removed to generate a joint photographic experts group (JPEG) file. The generated JPEG file is displayed on the display unit 23, and is stored in the storage unit 37. All the operations of the image processing unit 35 are performed under the control of the digital signal processing unit 39.

The digital signal processing unit 39 will be described in two different embodiments here. In the first embodiment, the digital signal processing unit 39 calculates an auto-focus (AF) peak value from a liveview image, and calculates a defocus correction value from MTF data that is stored in the memory 33-13, and shifts the focus lens 33-12 to a position corresponding to the total value of the AF peak value and the defocus correction value. The digital signal processing unit 39 according to a second embodiment shifts the focus lens 33-12 to a position corresponding to the total value of the AF peak value calculated from a liveview image and the focus position correction value stored in the memory 33-13.

First, the digital signal processing unit 39 according to the first embodiment includes an AF value calculation unit 39-1, an AF correction unit 39-2, and a focus motor control unit 39-3 for adjusting focus using the MTF characteristics of a lens.

The AF value calculation unit 39-1 calculates AF values with respect to a liveview image according to the movement of the focus lens 33-12. To this end, the AF value calculation unit 39-1 includes a high pass filter (HPF) 39-11 and an addition unit 39-12. A brightness signal of a digital image signal output from the ADC 33-4 of the image pickup unit 33 is filtered using the HPF 39-11, and the addition unit 39-12 adds up brightness signals that are filtered using the HPF 39-11. Thus, a value output from the addition unit 39-12 is an AF value.

FIG. 4A through 4D are waveform diagrams for explaining focus adjustment using MTF characteristics of a lens of the focusing apparatus of FIG. 3.

AF values are extracted from the HPF 39-11 and the addition unit 39-12 while shifting the focus lens 33-12 by incremental steps from the current position of the focus motor 33-2, and then the focus lens 33-12 is reversely shifted using the AF values and fixed to find an AF peak value.

The AF correction unit 39-2 calculates defocus correction values from MTF data stored in the memory 33-13, and calculates an actual AF peak value using the total value of the AF peak value calculated from the AF value calculation unit 39-1 and the defocus correction value. A control unit 39-4 reads MTF data from the memory 33-13 included in the barrel 33-1 of the image pickup unit 33 when the digital image processing apparatus is initialized.

Figure 4A:
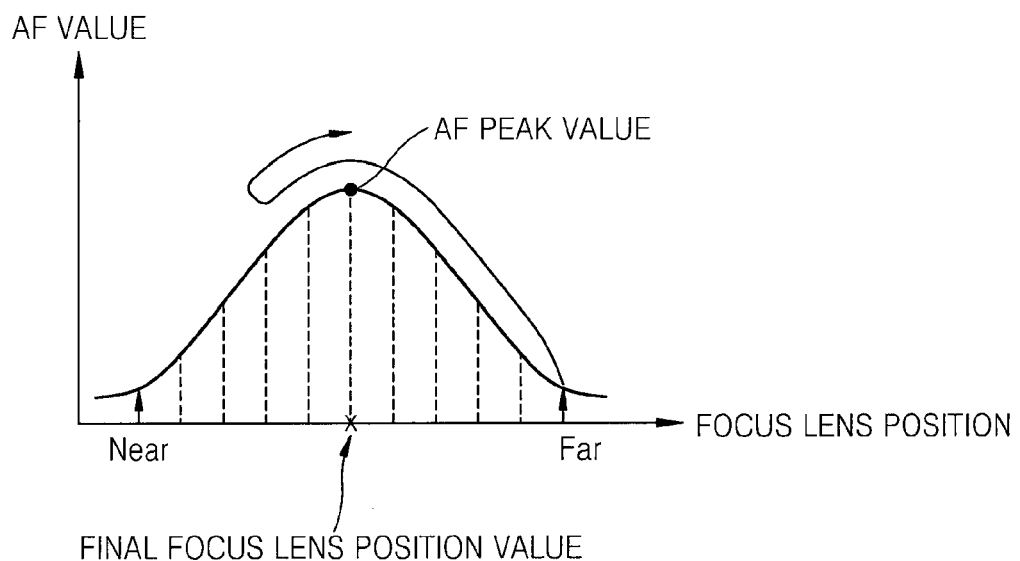
FIG. 4A through 4D are waveform diagrams for explaining focus adjustment by using MTF characteristics of a lens of the focusing apparatus of FIG. 3.
Figure 4B:
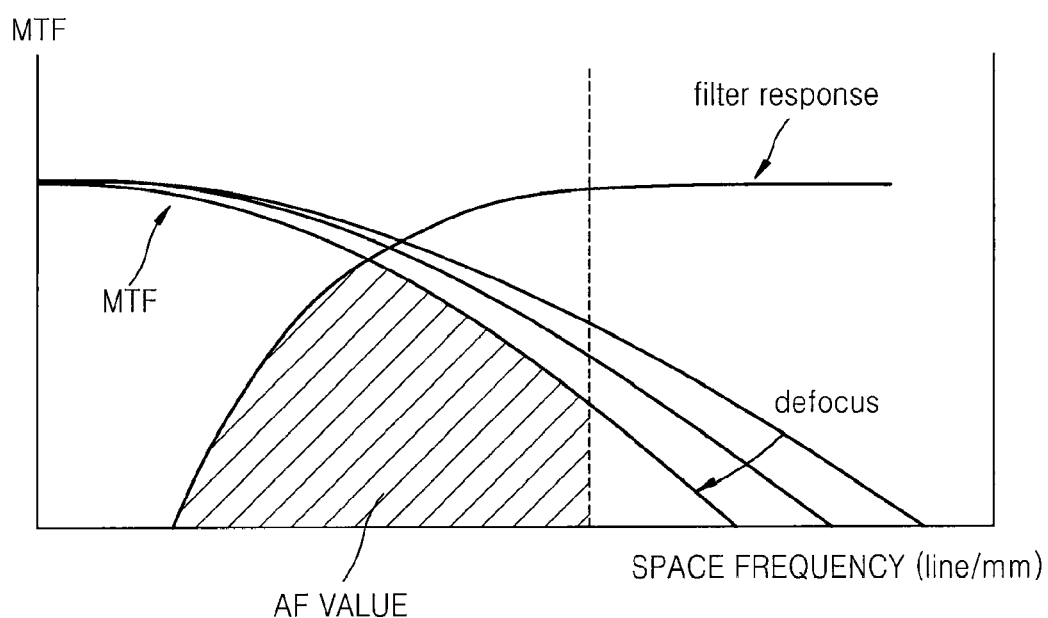

FIG. 4B is a graph for explaining the calculation of AF values according to the relationship between the MTF characteristics of the focus lens 33-12 and the characteristics of the HPF 39-11. The AF value stated with reference to FIG. 4A is an integrated value of the MTF characteristics of the focus lens 33-12 and a characteristic component of the HPF 39-11. That is, when a defocus is generated, the MTF characteristics are decreased, and thus as the defocus is increased, the AF value is decreased. Accordingly, the AF value reaches a peak when best focusing is performed.

Figure 4C:
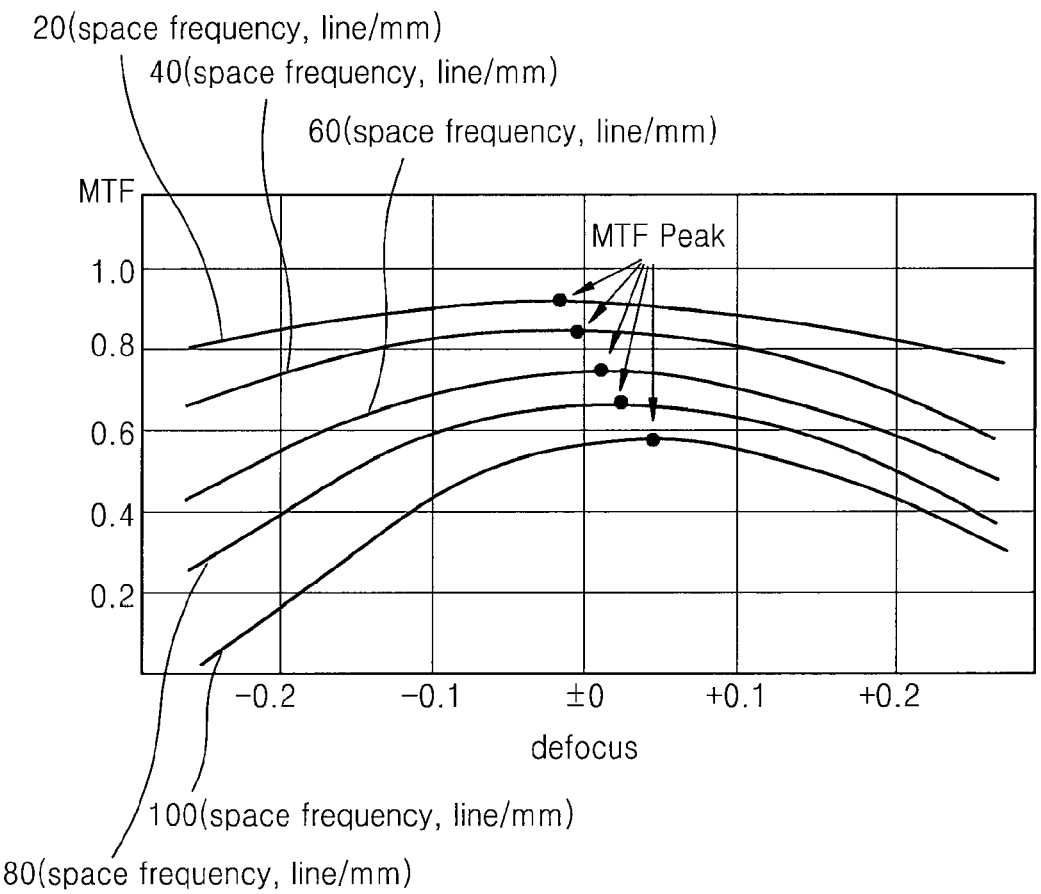

FIG. 4C shows exemplary characteristics of MTF. In general, an AF peak value becomes the focus position as illustrated in FIG. 4A, but a defocus characteristic of the focus lens 33-12 may be related to other characteristics according to the space frequency. As shown in FIG. 4C, as the space frequency increases, the MTF peak value is shifted to (+).

Figure 4D:
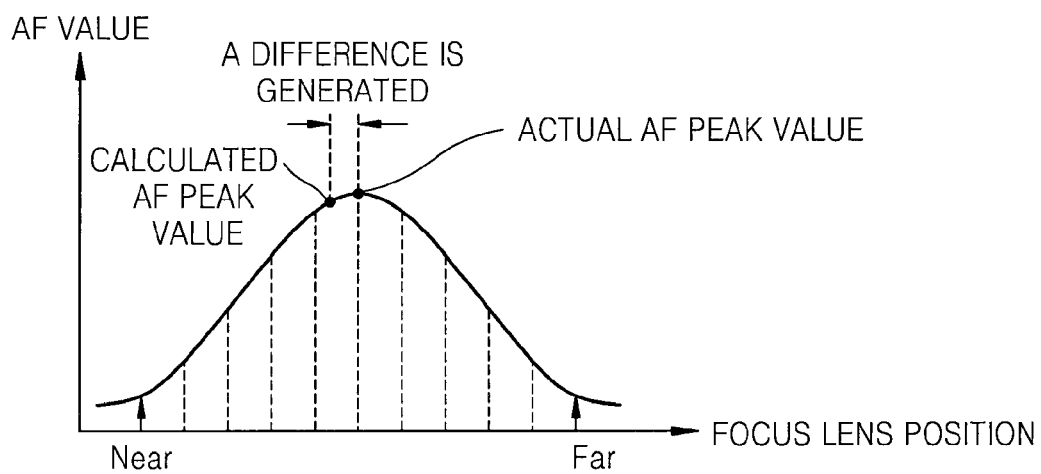

That is, the MTF characteristics of the focus lens 33-12 is not reflected in the AF peak value calculated by the AF value calculation unit 39-1, and thus a difference is generated between an actual AF peak value and the AF peak value calculated by the AF value calculation unit 39-1, as shown in FIG. 4D. Accordingly, the AF correction unit 39-2 calculates a defocus correction value from MTF data, that is, the amount by which the MTF peak value is shifted to (+) or (−), and calculates an actual AF peak value using the total value of the AF peak value calculated in the AF value calculation unit 39-1 and the defocus correction value.

The defocus correction value is calculated differently depending on the position of the zoom lens 33-11, the type of the focus lens 33-12, the number of pixels of the image sensor 33-3, the display condition of a liveview image by pixel addition or pixel subtraction, and the movement amount/speed of the focus motor 33-2.

The focus motor control unit 39-3 shifts the focus motor 33-2 using the actual AF peak value calculated in the focus correction unit 39-2.

The control unit 39-4 reads MTF data from the memory 33-13 included in the barrel 33-1 of the image pickup unit 33 when the digital image processing apparatus is initialized, and controls the operations of the AF value calculation unit 39-1, the AF correction unit 39-2, and the focus motor control unit 39-3 for adjusting auto-focusing (AF).

The digital signal processing unit 39 according to the second embodiment will be described hereinafter. The digital signal processing unit 39 of the second embodiment is different from that of the first embodiment in that the focus position correction value is read from the memory 33-13 included in the barrel 33-1 of the image pickup unit 33 when the digital image processing apparatus is initialized. The digital signal processing unit 39 of the first embodiment reads MTF data from the memory 33-13 to calculate a defocus correction value. The digital signal processing unit 39 according to the second embodiment reads a focus position correction value from the memory 33-13 and adds the focus position correction value with the AF peak value to move the focus lens 33-12 using the total of the focus position correction value and the AF peak value.

The digital signal processing unit 39 according to the second embodiment includes a focus value calculation unit 39-1, an AF correction unit 39-2, and a focus motor control unit 39-3.

The AF value calculation unit 39-1 calculates AF values according to the movement of the focus lens 33-12 with respect to a liveview image. Since description on the AF value calculation unit 39-1 is identical to the first embodiment, it will not be repeated.

The AF correction unit 39-2 adds up the focus position correction value stored in the memory 33-13 and an AF peak value calculated in the AF value calculation unit 39-1 to calculate an actual AF peak value. The control unit 39-4 reads a focus position correction values from the memory 33-13 included in the barrel 33-1 of the image pickup unit 33 when the digital image processing apparatus is initialized. The focus position correction value is applied differently according to the position of the zoom lens 33-11.

The focus motor control unit 39-3 shifts the focus motor 33-2 using the actual AF peak value calculated in the focus correction unit 39-2.

The control unit 39-4 reads MTF data from the memory 33-13 included in the barrel 33-1 of the image pickup unit 33 when the digital image processing apparatus is initialized, thereby controlling the operations of the AF value calculation unit 39-1, the AF correction unit 39-2, and the focus motor control unit 39-3 for adjusting AF.

Hereinafter, a method of adjusting focus using the MTF characteristics of a lens in a digital image processing apparatus according to an embodiment of the present invention will be described in detail. In the method of adjusting focus according to the present invention, a main algorithm of the focus adjusting method may be performed inside the digital signal processing unit 39 with the help of the peripheral elements inside the focusing apparatus according to embodiments.

FIG. 5 is a flowchart illustrating a method of adjusting focus using the MTF characteristics of a lens in a digital image processing apparatus according to an embodiment of the present invention.

When the digital image processing apparatus is turned on in operation 501, a digital signal processing unit 39 initializes the digital image processing apparatus in operation 503, and initializes the barrel 33-1 in operation 505.

When the initialization of the barrel 33-1 is completed, the digital signal processing unit 39 reads MTF data from the memory 33-13 included in the barrel 33-1 in operation 507. MTF data which examines the performance of a lens of the focus lens 33-12 included in the digital image processing apparatus is stored in the memory 33-13 included in the barrel 33-1. An MTF provides a value of the light amount (space frequency) transmitted through a lens, indicating how well the light from an object (original) is transmitted through the lens. MTF is usually used to measure the performance of the lens or the optimum focus position.

When reading of MTF data is completed, the digital signal processing unit 39 displays a liveview image on a display unit 23 in operation 509.

After the liveview image is displayed, the digital signal processing unit 39 checks whether the shutter-release button 11 is pressed half-way in operation 511, and when the shutter-release button 11 is pressed half-way, an AF value is acquired from the liveview image in operation 513, and an AF peak value is calculated in operation 515. As illustrated in FIG. 4A, the digital signal processing unit 39 shifts the focus lens 33-12 by basic steps from the current position of the focus motor 33-2, and extracts an AF value from a brightness signal that is filtered using a high pass filter, and then shifts the focus lens 33-12 reversely using the AF value and fixes the focus lens 33-12 to find an AF peak value.

When the AF peak value is calculated, the digital signal processing unit 39 calculates a defocus correction value using MTF data in operation 517. The AF value stated with reference to FIG. 4A may be expressed as an integrated value of the MTF characteristic of the focus lens 33-12 and the characteristic component of the HPF 39-11. In other words, when a defocus is generated, the MTF characteristics are decreased. Thus the as the defocus is increased, the AF value is decreased. Thus the AF value reaches a peak when best focusing is performed. FIG. 4C shows exemplary characteristics of MTF. In general, an AF peak value is the focus position as illustrated in FIG. 4A, but defocus characteristic of the focus lens 33-12 may be related to other characteristics according to the space frequency. As shown in FIG. 4C, as the space frequency increases, the MTF peak value is shifted to (+). That is, the MTF characteristics of the focus lens 33-12 are not reflected in the AF peak value calculated by the AF value calculation unit 39-1, and thus a difference is generated between an actual AF peak value and the AF peak value calculated by the AF value calculation unit 39-1, as shown in FIG. 4D. Accordingly, the digital signal processing unit 39 can calculate a defocus correction value from MTF data, that is, the amount by which the MTF peak value is shifted to (+) or (−).

When the defocus correction value is calculated, the digital signal processing unit 39 calculates an actual AF peak value in operation 519. The MTF characteristics of the focus lens 33-12 are not reflected in the AF peak value calculated from FIG. 4A, and thus a difference is generated between the actual AF peak value and the calculated AF peak value. Thus this difference can be calculated as a defocus correction value from MTF data, and the actual AF peak value is the total value of the AF peak value plus the defocus correction value.

When the actual peak value is calculated, the digital signal processing unit 39 shifts the focus lens 33-12 to the actual AF peak value in operation 521.

When the focus adjustment is completed by the shift of the focus lens 33-12, the digital signal processing unit 39 checks whether the shutter-release button 11 is fully pressed in operation 523, and when the shutter-release button 11 is fully pressed, the digital signal processing unit 39 captures a liveview image in operation 525.

FIG. 6 is a flowchart illustrating a method of adjusting focus using the MTF characteristics of a lens in a digital image processing apparatus according to another embodiment of the present invention.

When the digital image processing apparatus is turned on in operation 601, the digital signal processing unit 39 initializes the digital image processing apparatus in operation 603, and initializes the barrel 33-1 in operation 605.

When the initialization of the barrel 33-1 is completed, the digital signal processing unit 39 reads a focus position correction value of the focus lens 33-12 from the memory 33-13 included in the barrel 33-1 in operation 607. A focus position correction value, which can be used to examine the performance of a lens of the focus lens 33-12 included in the digital image processing apparatus, is stored in the memory 33-13 included in the barrel 33-1. An MTF provides a value of the light amount (space frequency) transmitted through a lens, indicating how well the light from an object (original) is transmitted through the lens. MTF is usually used to measure the performance of the lens or the optimum focus position.

When reading of the focus position correction value is completed, the digital signal processing unit 39 displays a liveview image on the display unit 23 in operation 609.

After a liveview is displayed, the digital signal processing unit 39 checks whether the shutter release button 11 is pressed half-way in operation 611, and when the shutter-release button 11 is pressed half-way, an AF value is acquired from the liveview image in operation 613 and an AF peak value is calculated in operation 615. As illustrated in FIG. 4A, the digital signal processing unit 39 shifts the focus lens 33-12 by incremental steps from the current position of the focus motor 33-2, and extracts an AF value from a brightness signal that is filtered using a high pass filter, and then shifts the focus lens 33-12 reversely by using the AF value and fixes the focus lens 33-12 to find an AF peak value.

When the AF peak value is calculated, the digital signal processing unit 39 calculates an actual AF peak value in operation 617. Since the MTF characteristics are not reflected in the AF peak value calculated from FIG. 4A, a difference is generated between the actual AF peak value and the AF peak value calculated from FIG. 4A. This difference can be replaced with the focus position correction value, and then the actual AF value becomes the AF peak value plus the focus position correction value.

When the AF peak value is calculated, the digital signal processing unit 39 shifts the focus lens 33-12 to the actual AF peak value in operation 619.

When the focus adjustment is completed by the shift of the focus lens 33-12, the digital signal processing unit 39 checks whether the shutter-release button 11 is fully pressed in operation 621, and when the shutter-release button 11 is fully pressed, the digital signal processing unit 39 captures a liveview image in operation 623.

As described above, in order to perform focus adjustment, a memory which stores MTF characteristics of a lens is included in a barrel of a digital image processing apparatus, and a defocus correction value or a focus position correction value is calculated from the MTF characteristics stored in the memory and then the focus peak value is shifted by the corresponding correction value. Thus a difference generated during focus adjustment is reduced, thereby obtaining a high quality image with its focus adjusted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for adjusting focus in a digital image processing apparatus, the apparatus comprising:
    an image pickup unit in which modulation transfer function (MTF) data usable to represent the performance of a lens is stored; and
    a digital signal processing unit that calculates a focus peak value of an image and a defocus correction value based on the MTF data stored in the image pickup unit, and corrects a focus position using the focus peak value and the defocus correction value.

2. The apparatus of claim 1, wherein the digital signal processing unit reads the MTF data from the image pickup unit when the digital image processing apparatus is initialized.

3. The apparatus of claim 2, wherein the digital signal processing unit comprises:
    a focus value calculation unit that calculates focus values with respect to an image according to the movement of the focus lens;
    a focus correction unit that calculates a defocus correction value based on the MTF data and an actual focus peak value using the total value of the focus peak value and the defocus correction value; and
    a focus motor controlling unit that corrects the focus position to a position corresponding to the actual focus peak value.

4. The apparatus of claim 3, wherein the defocus correction value is calculated differently according to the position of a zoom lens, the type of the focus lens, the pixel number of an image sensor, the display condition of a liveview image, and the movement amount/speed of a focus motor.

5. An apparatus for adjusting focus in a digital image processing apparatus, the apparatus comprising:
    an image pickup unit that stores a focus position correction value of a lens; and
    a digital signal processing unit that corrects the focus position using an AF peak value calculated from an image and the focus correction value stored in the image pickup unit.

6. The apparatus of claim 5, wherein the focus correction value is stored differently according to the position of a zoom lens.

7. The apparatus of claim 5, wherein the digital signal processing unit reads the focus position correction values from the image pickup unit when the digital image processing apparatus is initialized.

8. The apparatus of claim 7, wherein the digital signal processing unit comprises:
    a focus value calculation unit that calculates focus values with respect to an image according to the movement of the lens;
    a focus correction unit that calculates an actual focus peak value with the total value of the focus peak value and the focus position correction value; and
    a focus motor control unit that corrects the focus position to a position corresponding to the actual focus peak value.

9. A method of adjusting focus of a digital image processing apparatus, the method comprising:
    (a) calculating focus values from an image according to the movement of a focus lens;
    (b) calculating a defocus correction value from modulation transfer function (MTF) data that is usable to represent the performance of a lens included in the digital image processing apparatus; and
    (c) correcting the focus position using the focus peak value and the defocus correction value.

10. The method of claim 9, wherein before (a), the MTF data is read when the digital image processing apparatus is initialized.

11. The method of claim 10, wherein in (b), the defocus correction value is calculated differently according to the position of a zoom lens, the type of the focus lens, the pixel number of an image sensor, the display condition of a liveview image, and the movement amount/speed of a focus motor.

12. The method of claim 10, wherein in (c), an actual focus peak value is calculated using the total value of the focus peak value and the defocus correction value to correct the focus position to a position corresponding to the actual focus peak value.

13. A method of operating a digital image processing apparatus, the method comprising:

(a) receiving a focus position correction value of a lens included in the digital image processing apparatus;

(b) calculating focus values from an image according to the movement of a focus lens; and (c) correcting the focus position using a focus peak value and the focus position correction value.

14. The method of claim 13, wherein the focus position correction value differs according to the position of a zoom lens.

15. The method of claim 13, wherein in (c), an actual focus peak value is calculated using the total value of the focus peak value and the focus position correction value to correct the focus position to a position corresponding to the actual focus peak value.

* * * * *